United States Patent
Reusing

(10) Patent No.: US 7,826,106 B2
(45) Date of Patent: Nov. 2, 2010

(54) SCANNING DEVICE HAVING POSITION CORRECTING MEASURING DEVICE WITH CONNECTED MONITORING DEVICE

(75) Inventor: Guenter Reusing, Niederwerrn (DE)

(73) Assignee: Robert Bosch GmbH, Stuttgart (DE)

( * ) Notice: Subject to any disclaimer, the term of this patent is extended or adjusted under 35 U.S.C. 154(b) by 900 days.

(21) Appl. No.: 11/686,975

(22) Filed: Mar. 16, 2007

(65) Prior Publication Data

US 2007/0216399 A1    Sep. 20, 2007

(30) Foreign Application Priority Data

Mar. 16, 2006    (DE) .................. 10 2006 012 074

(51) Int. Cl.
*H04N 1/04*    (2006.01)
*H04N 1/40*    (2006.01)
(52) U.S. Cl. .................. 358/474; 358/488
(58) Field of Classification Search .......... 358/474, 358/486, 488, 491, 494, 497; 702/94, 106; 324/207.12; 701/214
See application file for complete search history.

(56) References Cited

U.S. PATENT DOCUMENTS

| | | | |
|---|---|---|---|
| 4,879,671 A | 11/1989 | Rieder et al. ............ 702/97 |
| 5,612,906 A | 3/1997 | Gotz .................. 702/94 |
| 5,677,686 A | 10/1997 | Kachi et al. ............ 341/8 |
| 5,956,659 A | 9/1999 | Spies et al. ............ 702/94 |
| 6,611,138 B2 | 8/2003 | Vasiloiu ............ 324/207.12 |
| 6,989,905 B2 * | 1/2006 | De Groot ............ 356/516 |
| 7,194,370 B2 | 3/2007 | Oberhaus et al. ...... 702/106 |
| 7,251,575 B2 * | 7/2007 | Hiller ............ 702/94 |
| 7,294,988 B2 * | 11/2007 | Ajima et al. ......... 318/712 |

FOREIGN PATENT DOCUMENTS

| | | |
|---|---|---|
| DE | 20 22 151 | 10/1977 |
| DE | 0 172 803 | 2/1986 |
| DE | 282 338 | 7/1994 |
| DE | 43 31 151 | 3/1995 |
| DE | 195 02 399 | 10/1995 |
| DE | 197 12 622 | 10/1998 |
| DE | 102 44 848 | 4/2004 |
| EP | 1 164 358 | 12/2001 |

* cited by examiner

*Primary Examiner*—Gabriel I Garcia
(74) *Attorney, Agent, or Firm*—Michael J. Striker

(57) ABSTRACT

A position measuring device has an incremental dimensional standard and also an associated scanning unit that emits at least two analog, phase-shifted periodic output signals and a monitoring device, so that a value of the output signals emitted by the scanning unit codes a state of the monitoring device. The scanning unit includes a sensor for scanning the dimensional standard, which generates at least one analog sample signal, and an evaluating unit, based on the sampled signal, determines a position value, while a synthesis device synthesizes phase-shift, periodic output signals based on the position value.

8 Claims, 1 Drawing Sheet

SCANNING DEVICE HAVING POSITION CORRECTING MEASURING DEVICE WITH CONNECTED MONITORING DEVICE

CROSS-REFERENCE TO A RELATED APPLICATION

The invention described and claimed hereinbelow is also described in German Patent Application DE 10 2006 012 074 filed on Mar. 16, 2006. This German Patent Application, whose subject matter is incorporated here by reference, provides the basis for a claim of priority of invention under 35 U.S.C. 119(a)-(d).

BACKGROUND OF THE INVENTION

The present invention relates to a position measuring device.

A position measuring device of this type is known, e.g., from DE 20 22 151 A1. That publication describes an optical position-measuring device, with which a dimensional standard in the form of a transparent glass scale with periodically located, intransparent position markings is scanned by a scanning unit that includes a lamp and photoelements. The scanning unit generates two phase-shifted, periodic signals that are substantially sinusoidal or cosinusoidal. Furthermore, a monitoring device is provided, which monitors the phase position and amplitude of the phase-shifted, periodic signals. If there is a deviation from a specified target value, the monitoring device outputs an error signal via a separate error output.

SUMMARY OF THE INVENTION

The object of the present invention is to provide a position measuring device, with which error signaling is made possible without the use of a separate error output.

With these objects and with others which will become apparent hereinafter, one feature of the present invention resides, briefly stated, in a The position measuring device, comprising an incremental dimensional standard; an associated scanning unit that emits at least two analog, phase-shifted periodic output signals; and a monitoring device, wherein said scanning unit and said monitoring device being configured so that a value of said output signals emitted by said scanning unit codes a state of said monitoring device.

In the evaluation of the phase-shifted, periodic output signals, the position determination depends only on the phase position of the output signals. To determine the phase position, e.g., via the arcsine of the current output signal divided by its amplitude, information about the amplitude of the individual signals is required. For this reason, two phase-shifted, periodic signals are typically used in incremental measuring devices, so that the value of the two individual signals corresponds to the amplitude of a single signal. With sine and cosine output signals, the value is the root of the squared values of the individual signals. With other types of periodic output signals, the value is defined—within the framework of the present application—as a calculated variable formed from the individual output signals that is essentially independent of the phase position of the individual output signals. Based on the phase position determined in this manner, a position measurement value that is much more accurate than subdividing the dimensional standard can be derived in a manner known per se. This is also referred to as interpolation in this context.

To ensure the specified accuracy of the measurement system, the value of the output signals must not fall below a specified value. A value that is too small is therefore a sign of a malfunction of the position measuring device. If there are other malfunctions in the position measuring device that were determined by the monitoring device, the error state can also be displayed—according to the characterizing part of Claim 1—using an abnormal value of the output signals. This could be carried out, e.g., by an analog amplifier for the output signals, the amplification factor of which is specified by the monitoring device. In the normal state, the amplification factor would be one. If there were an error, an amplification factor would be used that is much greater than or less than one. Different amplification factors could be provided, depending on the error type.

The problem results, however, that, if the output signals are not sinusoidal or cosinusoidal, it is not possible to directly determine a value that is independent of the phase position. This can be the case, e.g., with an inductive position measuring device according to EP 1 164 358 B1. In this case, the periodic signals deviate relatively significantly from the ideal shape; more complex methods are therefore required to determine the phase position.

To solve this problem, it is provided that the scanning unit includes a sensor for scanning the dimensional standard, and the sensor generates at least one analog sampled signal. An evaluating unit is also provided that determines a position value based on the sampled signal. In addition, a synthesis device is provided that synthesizes the phase-shifted, periodic output signals—preferably a sine signal and a cosine signal—based on the position value. Analog output signals can therefore be provided independently of the type of sampled signals, and based on which a value can be calculated that is independent of the phase angle.

A further advantage of this embodiment results from the fact that the value of the output signals during normal operation can be specified in a fixed manner. When error states occur that do not halt the operation of the position measuring device, e.g., slight abnormal temperature increases in the position measuring device, an output signal value that deviates only slightly from the normal value can therefore selected for the error display. The evaluation quality in a downstream evaluation circuit is therefore not negatively affected.

The evaluating unit can include an analog-digital converter for converting the analog sampled signal to a digital intermediate signal, and it can include an evaluating arithmetic unit for generating a digital position value based on the digital intermediate signal. With the aid of the evaluating arithmetic unit designed, e.g., as a digital integrated circuit, it is possible—in a manner known per se—to carry out nearly any complicated arithmetic operation, in order to obtain an accurate position value from non-sinusoidal sampled signals. The analog-digital converter can be designed as a sigma-delta converter, in order to attain a high level of measurement accuracy.

For similar reasons, the synthesis device can include a synthesis arithmetic unit for calculating at least two digital signal values based on the position value, a coding factor specified by the monitoring device, and at least one digital-analog converter for converting the digital signal values into the analog output signals. The coding factor can be used to modulate the amplitude of the output signals in a manner according to the present invention. It can be provided that a digital-analog converter provides all output signals by switching rapidly between the various channels ("multiplexing"). It is also possible to provide a separate digital-analog converter for every output signal, so that high signal quality can be attained.

It can be further provided that the synthesis arithmetic unit includes at least two tables that assign a function value to each position value; when the digital signal values are generated, the coding factor reduces the function values—preferably by at least 50%, and most preferably by 100%—or leaves them unchanged. The use of tables makes it possible to calculate the digital signals quickly, thereby enabling the position measuring system to also be used at high traversing rates.

By reducing the output signal values when a malfunction occurs, it is possible to make full use of the limited value range of the digital signals during normal operation, thereby resulting in high measurement accuracy. In the simplest case, the reduction can take place by multiplying by a factor less than one.

It is also possible to provide a different function, particularly when several error states are to be coded in a specified value range.

The case of reducing by 100%, i.e., setting the output signals to zero, can be carried out particularly easily and rapidly. It should be noted, however, that this state can interfere with a downstream evaluating unit to the extent that operation is halted.

It is further provided that the monitoring device determines at least one of the following parameters:
 the voltage supplied to the position measuring device,
 the distance between the sensor and the dimensional standard,
 the amplitude of the analog sampled signals or the digital intermediate signals,
 the ambient temperature or the temperature of the scanning unit,
 the extent to which the digital value range is utilized by the digital intermediate signals,
 position value,
 speed value,
 acceleration value, and the parameter(s) are compared with a corresponding reference parameter or set of reference parameters, and the value of the output signals is selected according to the result of the comparison. In this manner, an unreliable operating state of the position measuring device can be reliably detected.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
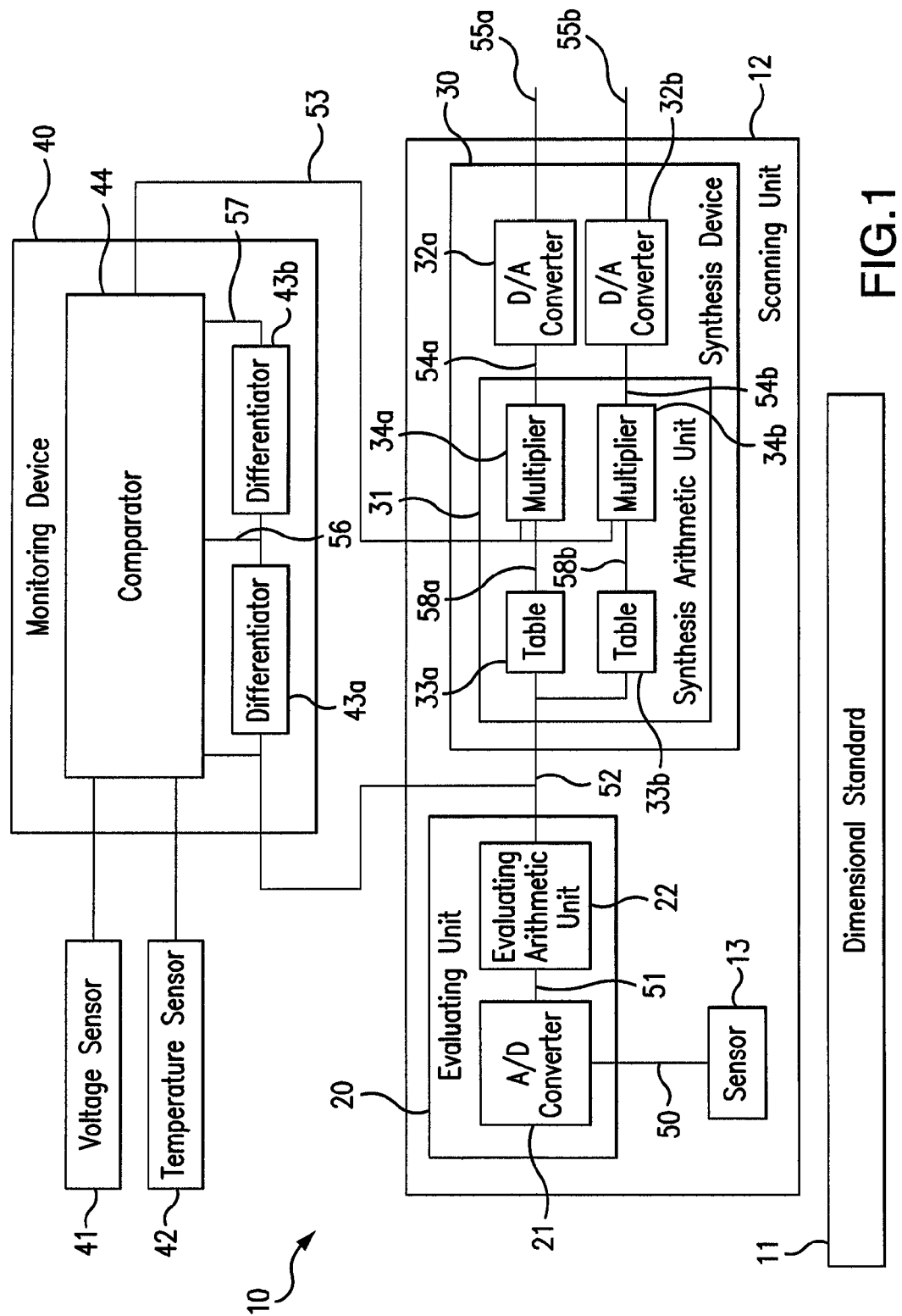
FIG. 1 shows a block diagram of a position measuring device in accordance with the present invention.

A position measuring device according to the present invention is labelled in general with reference numeral 10 in FIG. 1. Position measuring device 10 is integrated in a linear roller bearing according to DE 103 47 360 A1, which is therefore referred to herewith in entirety. The position to be determined is the position of the guide carriage relative to the guide rail.

Position measuring device 10 includes a dimensional standard 11, which is designed as a thin metal band with a large number of rectangular recesses located as regular intervals. Dimensional standard 11 is scanned by a scanning unit 12 using a sensor 13 that is designed as described in EP 1 164 358 B1, which is therefore also referred to herewith in entirety.

A monitoring device 40 is also provided, with which the correct function of position measuring device 10 is monitored. Scanning unit 12 and monitoring device 40 are integrated in an assembly.

Analog sampled signals 50 generated by sensor 13 in the form of two electrical voltages are converted in evaluating unit 20 using analog-digital converters 21 into digital intermediate signals 51. Analog-digital converters 21 are designed as sigma-delta converters with a resolution of 12 bit. The electrical signals are amplitude-modulated signals with a carrier frequency of 10 kHz, which are scanned in a phase-synchronized manner with a four-fold scanning frequency, i.e., 40 kHz. It is therefore ensured that position measuring device 10 functions reliably when dimensional standard 11 is subdivided in 1 mm increments and the maximum traversing rate is 10 m/s.

An evaluating arithmetic unit 22 is also provided in evaluating unit 20, which creates a digital position value 52 based on digital intermediate signals 51. In a first step, it is assumed that intermediate signals 51 are exactly sinusoidal or cosinusoidal, and the associated phase angle is calculated using the known mathematical relationships. In a second step, the phase angles obtained in this manner are transformed into actual position values 52 using an experimentally determined correction table.

A synthesis device 30 is also provided, which digital position values 51 are converted—while incorporating a coding factor 53—into periodic analog output signals 55a, b in the form of a sinusoidal signal and a cosinusoidal signal. Synthesis device 30 includes a synthesis arithmetic unit 31, with which digital signal values 54a, b are calculated based on digital position values 52. Two tables 33a, b are provided for this purpose, which assign function value 58a, b of a sinusoidal function and a cosinusoidal function to each position value. Function values 58 are multiplied by a coding factor 53 using a multiplier 34a, b, which yields digital signal values 54a, b. Digital signal values 54a, b are then converted to analog output signals 55a, b using two digital-analog converters.

Coding factor 53 is generated by monitoring device 40 that operates using the following input variables:
 the temperature of the scanning unit, which is determined by a temperature sensor 42.
 the operating voltage of position measuring device 10, which is determined by a voltage sensor 41.
 position value 52, which is generated by evaluating unit 20,
 speed value 56, which is determined from position value 52 using a differentiator 43a.
 acceleration value 57, which is determined from speed value 56 using a differentiator 43b.

Comparator 44 of monitoring device 40 checks to determine whether each of these parameters is located in a specified permissible interval, and, only if they are, it outputs a coding factor with value 1. In any other case, a coding factor of 0.3 is output. If an error occurs, the value of analog output signals 55a, b is therefore only 30% of the normal value, thereby unequivocally indicating that an error has occurred with position measuring device 10.

It will be understood that each of the elements described above, or two or more together, may also find a useful application in other types of constructions differing from the type described above.

While the invention has been illustrated and described as embodied in a position measuring device with monitoring device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A position measuring device, comprising an incremental dimensional standard; an associated scanning unit that emits at least two analog, phase-shifted periodic output signals; and a monitoring device, wherein said scanning unit and said monitoring device being configured so that a value of said output signals emitted by said scanning unit codes a state of said monitoring device, wherein said scanning unit includes a sensor for scanning said dimensional standard, which generates at least one analog sample signal, while said evaluating unit, based on the sampled signal, determines a position value; and further comprising a synthesis device for synthesizing phase-shift, periodic output signals based on the position value.

2. A position as defined in claim 1, wherein said synthesis device synthesizes the phase-shifted periodic output signals formed as a sine signal and a cosine signal.

3. A position as defined in claim 1, wherein said evaluating unit includes an analog-digital convertor for converting the analog sampled signal to a digital intermediate signal, and an evaluating arithmetic unit for generating a digital position value based on the digital intermediate signal.

4. A position as defined in claim 1, wherein said synthesis device includes a synthesis arithmetic unit for calculating at least two digital signal values based on the position value, a coding factor specified by said monitoring device, and at least one digital-analog convertor for converting the digital signal values into the analog output signals.

5. A position as defined in claim 4, wherein said synthesis arithmetic unit includes at least two tables that assign a function value to at least each position value, and wherein when the digital signal value's are generated, the coding factor reduces the function values or leaves them unchanged.

6. A position as defined in claim 5, wherein said coding factor reduces the function values by at least 50%.

7. A position as defined in claim 5, wherein said coding factor reduces the function values by 100%.

8. A position as defined in claim 1, wherein said monitoring device is configured to determine at least one of parameters selected from the group consisting of a voltage supplied to the position measuring device, a distance between said sensor and said dimensional standard, an amplitude of the analog sample signals or digital intermediate signals, an ambient temperature or a temperature of said scanning unit, an extent to which a digital value range is utilized by the digital intermediate signals, a position value, a speed value, and an acceleration value; and further comprising means for comparing at least one of said parameters with a corresponding reference parameter or comparing a plurality of said parameters with a set of reference parameters so that the value of said output signals is selected according to a result of the comparison.

* * * * *